United States Patent
Itoh et al.

(10) Patent No.: US 8,887,897 B2
(45) Date of Patent: Nov. 18, 2014

(54) FAULT DIAGNOSIS METHOD FOR ROLLER CONVEYOR, ROLLER CONVEYOR, AND CONTROLLER FOR CONVEYOR

(75) Inventors: Kazuo Itoh, Kasai (JP); Toshiyuki Tachibana, Himeji (JP); Yoshiyuki Kujihashi, Kato (JP)

(73) Assignee: Itoh Denki Co., Ltd. (JP)

( * ) Notice: Subject to any disclaimer, the term of this patent is extended or adjusted under 35 U.S.C. 154(b) by 473 days.

(21) Appl. No.: 13/181,675

(22) Filed: Jul. 13, 2011

(65) Prior Publication Data

US 2012/0048682 A1 Mar. 1, 2012

(30) Foreign Application Priority Data

Aug. 31, 2010 (JP) ................. 2010-195091

(51) Int. Cl.
*B65G 43/00* (2006.01)
*B65G 13/02* (2006.01)

(52) U.S. Cl.
CPC ............... *B65G 43/00* (2013.01); *B65G 13/02* (2013.01)
USPC .................. 198/781.06; 198/781.05; 198/783

(58) Field of Classification Search
USPC ............... 198/781.05, 781.06, 781.09, 781.1, 198/783, 790
See application file for complete search history.

(56) References Cited

U.S. PATENT DOCUMENTS

| | | | | |
|---|---|---|---|---|
| 5,070,995 A * | 12/1991 | Schaffer et al. | ............ | 198/460.1 |
| 5,213,201 A * | 5/1993 | Huber et al. | ............ | 198/781.06 |
| 6,328,154 B1 * | 12/2001 | Huber | ...................... | 198/781.06 |
| 7,035,714 B2 * | 4/2006 | Anderson et al. | ............ | 700/228 |
| 2001/0010285 A1 * | 8/2001 | Itoh et al. | ................. | 198/781.06 |
| 2005/0065641 A1 * | 3/2005 | Nagai | ...................... | 198/781.06 |
| 2007/0261941 A1 * | 11/2007 | Pelak et al. | ............ | 198/781.05 |
| 2010/0058098 A1 * | 3/2010 | Saitou et al. | .................. | 713/400 |

FOREIGN PATENT DOCUMENTS

JP 2009-143704 7/2009

* cited by examiner

*Primary Examiner* — Leslie A Nicholson, III
(74) *Attorney, Agent, or Firm* — Wood, Phillips, Katz, Clark & Mortimer

(57) ABSTRACT

A fault diagnosis method for a roller conveyor including rollers, brushless motors, and zone controllers for controlling the brushless motors, the brushless motors and/or the rollers each having a rotation detector, the zone controllers each having a driver containing a logic circuit, a memory, which contains a program, and a micro computer is proposed. The program includes a fault diagnosis program and a criterial parameter. The zone controllers each obtain an operating parameter of the brushless motors and/or the rollers so as to perform comparison of the operating parameter with the criterial parameter and determine a failure of the roller conveyor in a case where a result of the comparison is above a predetermined level.

21 Claims, 17 Drawing Sheets

FAULT DIAGNOSIS METHOD FOR ROLLER CONVEYOR, ROLLER CONVEYOR, AND CONTROLLER FOR CONVEYOR

TECHNICAL FIELD

The present invention relates to a fault diagnosis method for a roller conveyor and a roller conveyor equipped with a fault diagnosis function and more specifically to a fault diagnosis method for a roller conveyor including rollers, a motor, and a controller for controlling the motor and to a roller conveyor.

The present invention also relates to a controller for a conveyor.

BACKGROUND ART

A roller conveyor has been used for easily conveying articles in facilities such as factories or shipping storages. Such a roller conveyor includes a plurality of rollers, some of which are provided with an electric motor. Recently, a conveyor line formed by conveyors has got complex. In order to easily control such a complicated conveyor line, there is provided a conveyor consisting of a plurality of zones, into which a conveyor line is divided.

A roller conveyor consisting of a plurality of control zones is excellent in economic efficiency and less unproductiveness because articles are conveyed by rotation of motors with respect to each control zone instead of integrated operation of the entire roller conveyor. Additionally, it is possible to dispense with a complicated control system since the conveyor is divided into small ranges to be controlled.

Hence, such a roller conveyor having a plurality of control zones increases in frequency for activating and stopping the motors, rendering parts such as a gear, a belt, and a clasp that fixes a motor output shaft subject to wear.

For that reason, it is important to do maintenance of the roller conveyor, which is mostly left to one's discretion such as an experimental rule, determination from the timing of the introduction of those, determination by palpation, and determination by sound and smell. That is not easy.

A patent document 1 specified below discloses an equipment diagnosis method for easily determining a time for replacement of consumable members in a device such as an electric motor. The method disclosed in the patent document 1 is designed to determine a time for replacement on the basis of a difference between a current of a motor in no-load driving in a sound condition of a device and a current of the motor in no-load driving in operation.

PATENT DOCUMENT

Patent Document 1: JP 2009-143704 A

DISCLOSURE OF INVENTION

Technical Problem

The equipment diagnosis method disclosed in the patent document 1 is carried out only by comparing currents of a motor in no-load driving in a sound condition and in operation. Thus, it may not be known exactly which member should be replaced in a device even when it is determined to be a time for replacement of consumable members. That requires check of the members in the device in order, which would be a troublesome work.

Taking into account the above-mentioned problems, the present invention proposed herein aims to provide a roller conveyor capable of identifying a faulty place, a faulty zone, and/or a faulty component. It also aims to provide a roller conveyor and a fault diagnosis method of a roller conveyor, which ensure detection of times for replacement of a plurality of consumable members by kind.

Solution to Problem

An aspect of the present invention proposed for achieving the aim described above has a basic configuration of a normal roller conveyor.

A roller conveyor in this aspect includes a plurality of rollers for conveying articles, at least one motor for rotating at least one of the rollers, and at least one controller for controlling the at least one motor.

This aspect defines information relating to rotation of the motor and/or the roller as rotational information and information relating to a current supplied and/or a voltage applied to the motor as electrical information.

The roller conveyor in this aspect is equipped with a memory for storing the rotational information and/or the electrical information in normal operation of the conveyor as criterial information, an information detector for detecting the rotational information and/or the electrical information in a present situation of the conveyor as present status information, and a comparator for performing comparison of the criterial information stored in the memory with the present status information.

In this aspect, the controller operates the at least one motor. The roller conveyor is adapted to perform comparison of criterial information showing an operating state in normal operation of the conveyor with present status information showing a present operating state. As a result of the comparison of the operating state in normal operation with the present operating state, presence or absence of a fault of a device is determined. The motor operated by the controller as described above is specified, which determines whether a component having the fault is the specified motor or a component receiving a power transmission from the specified motor.

Preferably, the roller conveyor is adapted to store in the memory a variation of the rotational information and/or the electrical information in a case where any of components constituting the roller conveyor has a fault as fault information by component and to refer to the fault information for identifying a location of the fault.

By this configuration, a component having a fault is directly identified.

Preferably, the roller conveyor is adapted to output a predetermined signal in a case where the comparison by the comparator shows that the present status information differs from the criterial information above a predetermined level.

Preferably, the criterial information is correlation between time and one selected from a group consisting of the current supplied and the voltage applied to the motor.

The criterial information employs, for example, a profile showing correlation between a current supplied to the motor and time. Herein, "a profile" is shown by a linear data indicating a wavy form, a trajectory, or the like.

Preferably, the criterial information is composed of pieces of rotational information of the motor and/or the roller when the motor and/or the roller rotates through inertia after starting energization of the motor and stopping the energization.

It is recommended to have such a configuration that the at least one controller includes a plurality of controllers, the controllers each having the memory for storing the criterial information, the information detector, and the comparator, wherein the conveyor further includes a supervisory controller being superior to the controllers and transfers a result of the comparison by the comparator to the supervisory controller.

It is also possible to have such a configuration that the at least one controller includes a plurality of controllers, wherein the conveyor further includes a supervisory controller being superior to the controllers and collects the present status information in the supervisory controller from each of the controllers.

The present aspect may apply an essential part to a controller.

An aspect relating to the controller includes at least one driving circuits for driving at least one motor for rotating at least one roller, and a control circuit for controlling the at least one motor, the controller obtaining information relating to rotation of the motor and/or the roller as rotational information and information relating to a current supplied and/or a voltage applied to the motor as electrical information, and being equipped with a memory for storing the rotational information and/or the electrical information in normal operation of the conveyor as criterial information, an information detector for detecting the rotational information and/or the electrical information in a present situation of the conveyor as present status information, and a comparator for performing comparison of the criterial information stored in the memory with the present status information, so that the controller obtains the present status information, performs a comparison of the criterial information stored in the memory with the present status information, and outputs a result of the comparison to another device.

An aspect relating to a method is a fault diagnosis method for a roller conveyor, the roller conveyor including a plurality of rollers for conveying articles; at least one motor for rotating at least one of the rollers, and at least one controller for controlling the at least one motor.

In this aspect, the roller conveyor is provided with a memory containing a program and a micro computer capable of executing the program, the program including a fault diagnosis program and a criterial parameter.

The method includes the steps of performing operation of the motor and/or the roller based on the fault diagnosis program so as to obtain individual state of the motor and/or the roller detected during the operation as an operating parameter, performing comparison of the operating parameter with the criterial parameter, and determining a fault of the roller conveyor in a case where a difference between the parameters as a result of the comparison is above a predetermined level.

Provision of a plurality of fault diagnosis programs in the program achieves detection of a plurality of failure modes specific to a roller conveyor. The detection of the failure modes depending on kinds of consumable members determines estimated time for replacement of each consumable member.

Further, provision of a desired criterial parameter in the program achieves detection of failure under desired conditions, thereby enabling setting of the time for replacement of each consumable member.

According to the fault diagnosis method for a roller conveyor in this aspect, the times for replacement of a plurality of consumable members are determined by kind.

The present aspect can be applied to the roller conveyor having a supervisory controller adapted to transfer a signal from and to the controller. The controller preferably includes the memory and the micro computer. The method further includes the steps of performing operation of the motor and/or the roller in response to a command from the supervisory controller, obtaining an operating parameter of the motor and/or the roller during the operation by the controller, determining presence or absence of a fault of the roller conveyor, and transferring the result of determination to the supervisory controller that is another device.

The program is stored in the memory of the controller, so that the controller solely monitors motions of the roller conveyor and detects a failure by failure mode. That accelerates the processing speed before detecting a fault.

Further, the controller solely processes, which reduces the load on the supervisory controller. Therefore, the supervisory controller has no possibility to go down even when dozens of conveyors are connected in a large-scale conveyor system, for example.

According to the fault diagnosis method in the present aspect, the controller solely detects the time for replacement of a plurality of consumable members by kind.

The supervisory controller accumulates data such as the operating parameter and a result of fault diagnosis stored in the controller by transferring the data to the supervisory controller. It is possible to perform a more detailed fault diagnosis or analysis by monitoring motions of the motors or the rollers of the past and the moment, for example.

It is also possible to optionally set in the program a transfer of the operating parameter or the result of the fault diagnosis to the supervisory controller as a command. There is such a way to transfer to the supervisory controller, for example, only in a case of satisfying a setup condition.

Alternatively, the supervisory controller preferably includes the memory and the micro computer. The program may be stored in the memory of the supervisory controller. The motor and/or the roller is operated in response to a command by the supervisory controller, so that an operating parameter of the motor and/or the roller during the operation is obtained.

Preferably, the method further includes the steps of sending a command from the supervisory controller to the controller so as to control timing for executing the fault diagnosis program.

A controller provided with a micro computer (CPU) is easily controlled by the supervisory controller. The supervisory controller can discretionarily set the timing of operating the fault diagnosis program. It is possible to set is according to users' conveniences the timing, such that the program is operated at predetermined intervals during operation of the roller conveyor, at the beginning of the day, or at the end of the day. Besides, users can remotely control by using the supervisory controller without being required to enter a line in a work zone.

Preferably, the criterial parameter and the operating parameter each are either at least one selected from a group consisting of a speed of the motor and/or the roller, a current of the motor, and an operating time of the motor and/or the roller or correlation between more than one of the group.

By free combination of a speed of the motor and/or the roller, a current of the motor, an operating time of the motor and/or the roller, various failure modes can be quantified as a parameter. Consequently, the fault diagnosis can be performed by normal parameters used for controlling the roller conveyor, thereby dispensing with an additional and special device for a fault diagnosis.

Preferably, the at least one controller includes a plurality of controllers, to which the supervisory controller is connected.

By the connection of the plurality of controllers to the supervisory controller, the supervisory controller compares a plurality of data. It is possible to determine average lives of components such as the motor and the roller, for example.

Preferably, the fault diagnosis program is adapted to execute a predetermined operation upon activation of the roller conveyor, so as to obtain the operating parameter.

Normally, there is no article on the roller conveyor in activation of the roller conveyor. By execution of a predetermined initial operation of the rollers upon activation, there is no need to take an article out when a fault is found. That brings about ease of maintenance.

Preferably, the operating parameter is obtained by execution of at least one selected from a group consisting of a cycle of activation and stop, a cycle of normal rotation and reverse rotation, and an inching on the motor and/or the roller with no load at a low-speed rotation.

The motor and/or the roller rotating at a low speed has a large torque, and thus abrasion or loosening in a driving system easily becomes obvious by an operation such as activation and stop, normal rotation and reverse rotation, or inching. With abrasion or loosening in the driving system, it takes longer to start up a starting current of the motor. That enables, for example, to detect abrasion of a bracket fixing an output shaft of the motor, which is the driving system, to the roller.

Preferably, the operating parameter is obtained by rotating of the motor and/or the roller with no load, stopping current supply to the motor, and then making a free-run stop of the roller after inertia rotation.

Inertia rotation of the motor having rotated at a predetermined speed by stopping of energization eliminates influence by an electric brake of the motor applied to the roller. Specifically, the motor and/or the roller is exposed to a rolling resistance in a direction reverse to the rotating direction. The rolling resistance is caused by a belt synchronizing a plurality of rollers, a gear mounted to the motor, or the like. A low rolling resistance due to abrasion of the belt or the gear renders stopping of the rollers difficult. Thereby, it is possible to detect abrasion of the belt, the gear, or the like.

Preferably, the fault diagnosis program is adapted to obtain the operating parameter of the motor and/or the roller with no load after conveyance of an article by the motor and/or the roller during operation of the roller conveyor.

Monitoring of the operating parameter of the roller with no load after conveyance of an article by the motor and the roller detects a fault of the driving system. That ensures a simplified fault diagnosis even during operation of the roller conveyor.

Advantageous Effect of the Invention

The fault diagnosis method for a roller conveyor, the roller conveyor, and the controller in the present invention ensures determination of times for replacement of a plurality of consumable members by kind.

DESCRIPTION OF EMBODIMENTS

Now, a fault diagnosis method for a roller conveyor and a roller conveyor of embodiments of the present invention will be described in detail below, in reference to the accompanying drawings. The description below is to facilitate the comprehension of the embodiments and therefore it is to be understood that the invention is not limited to the embodiments thereof. The description is omitted as to the known art.

Figure 1:
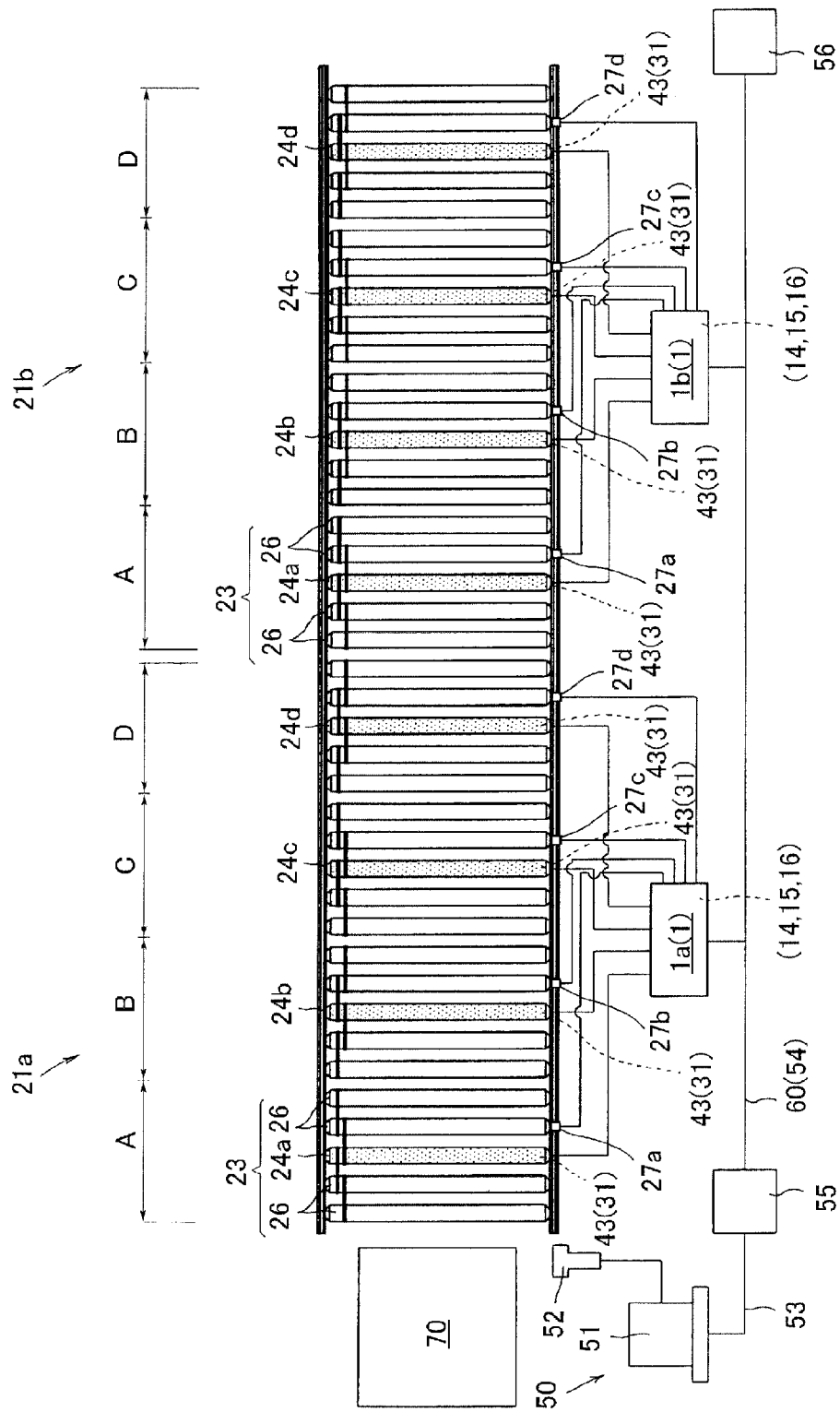
FIG. 1 is a conceptual diagram showing a roller conveyor of an embodiment of the present invention.

Referring to FIG. 1, a roller conveyor 20 is adapted to convey an article 70 to be conveyed or the like. The roller conveyor 20 includes zone controllers 1 (1a and 1b), linear conveying devices 21 (21a and 21b), and a supervisory controller 50.

Figure 2:
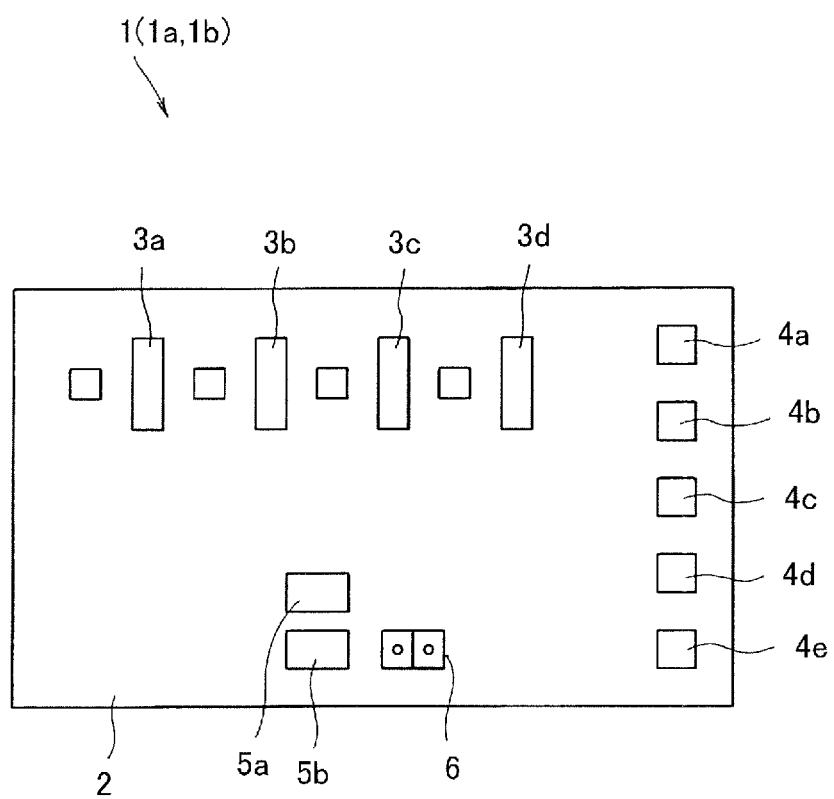
FIG. 2 is a front view showing a controller.

Referring to FIG. 2, the zone controllers 1a and 1b each have a motor control board 2. The motor control board 2 consists mainly of motor connectors 3a to 3d, sensor connectors 4a to 4e, communication connectors 5a and 5b, and a power connector 6.

Figure 3:
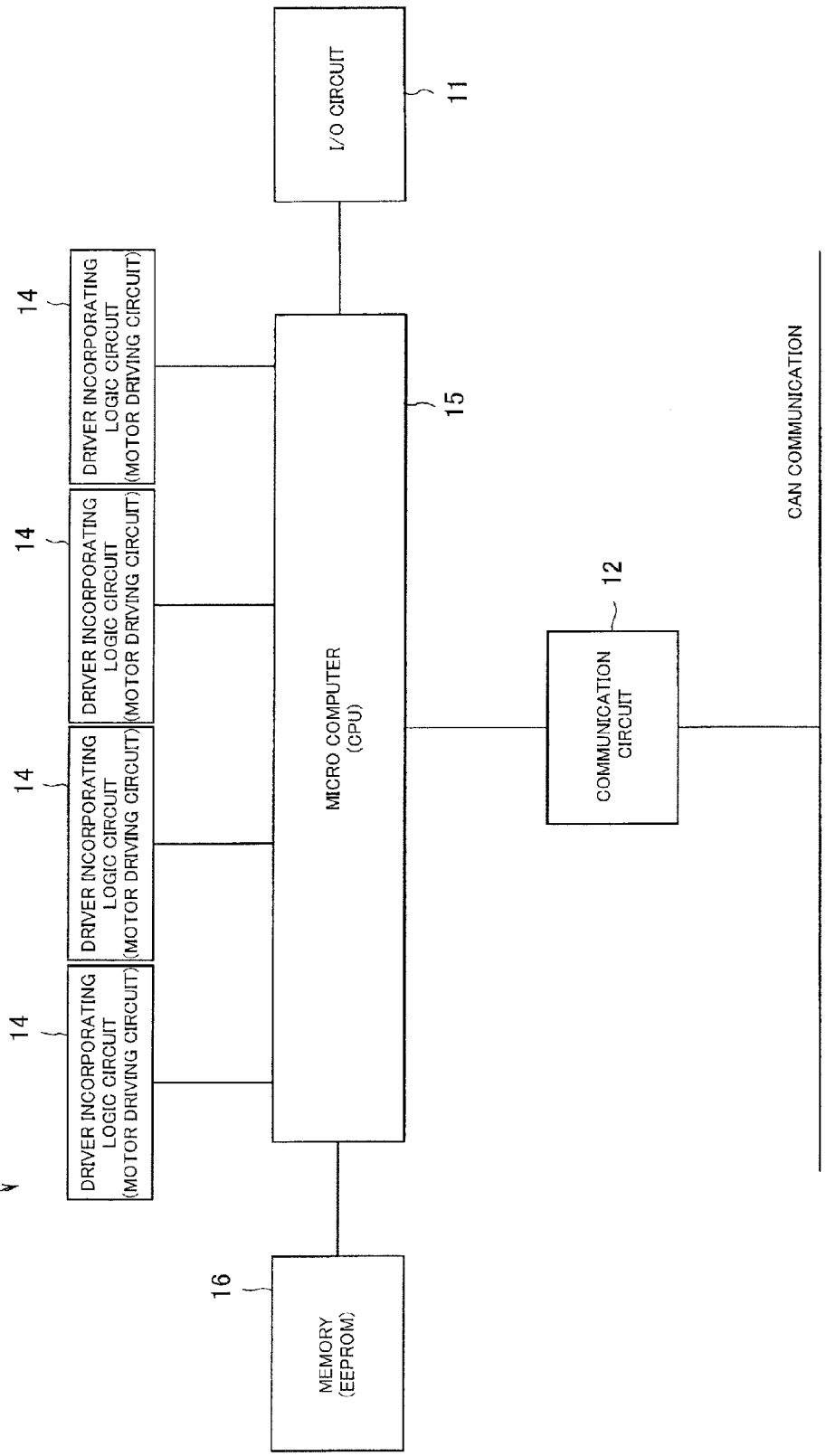
FIG. 3 is a block diagram showing a circuit structure of the controller.

As shown in a block diagram in FIG. 3, the zone controllers 1a and 1b each include an I/O circuit 11, a communication circuit 12, drivers 14 each incorporating a logic circuit (motor driving circuits), a micro computer (CPU) 15, and a memory (rewritable memory) 16. The zone controllers 1a and 1b independently control the roller conveyor 20 (the linear conveying devices 21) because each of the zone controllers 1a and 1b has the micro computer 15 and the memory 16.

The I/O circuit 11 is adapted to transfer input and output signals from and to an external device and connected to the sensor connector 4a to 4e.

The communication circuit 12 is adapted to communicate with other zone controllers and connected to the communication connectors 5a and 5b. The communication circuit 12 is compliant with CANopen standards.

The drivers 14 each are a motor driving circuit and have a programmable logic circuit not shown, performing PWM (pulse-width modulation) control. The drivers 14 are respectively connected to the motor connectors 3a to 3d.

The micro computer (CPU) 15 is a program arithmetic processing unit and has an RAM (main memory) not shown.

The memory 16 is a rewritable storage device and can accommodate programs and data. The memory 16 is preferably constituted by an electrically erasable programmable read-only memory (EEPROM) or a flush memory.

As shown in FIG. 1, the zone controllers 1a and 1b are connected to each other via a CAN communication wire 54, so as to constitute a bus (bus network) 60 via CAN communication.

One end of the bus 60 is connected to a gateway board 55, while the other end of the bus 60 is connected to a terminating resistance 56.

The gateway board 55 is connected to the supervisory controller 50 via a communication wire 53.

The supervisory controller 50 consists mainly of a computer 51 and a bar-code reader 52 connected to the computer 51.

The computer 51 in the supervisory controller 50 performs an overall control of the zone controllers 1a and 1b and a fault diagnosis of the roller conveyor 20. The computer 51 also performs a transfer of a program to the zone controllers 1a and 1b.

Herein, the computer 51 is capable of electronic encoding of information red by the bar-code reader 52, thereby assigning an ID (electronic code) referred to as "TrayID" to the article 70.

The linear conveying devices 21a and 21b have the same configuration and connected to each other in series. The linear conveying devices 21a and 21b convey articles in a linear direction.

Figure 4:
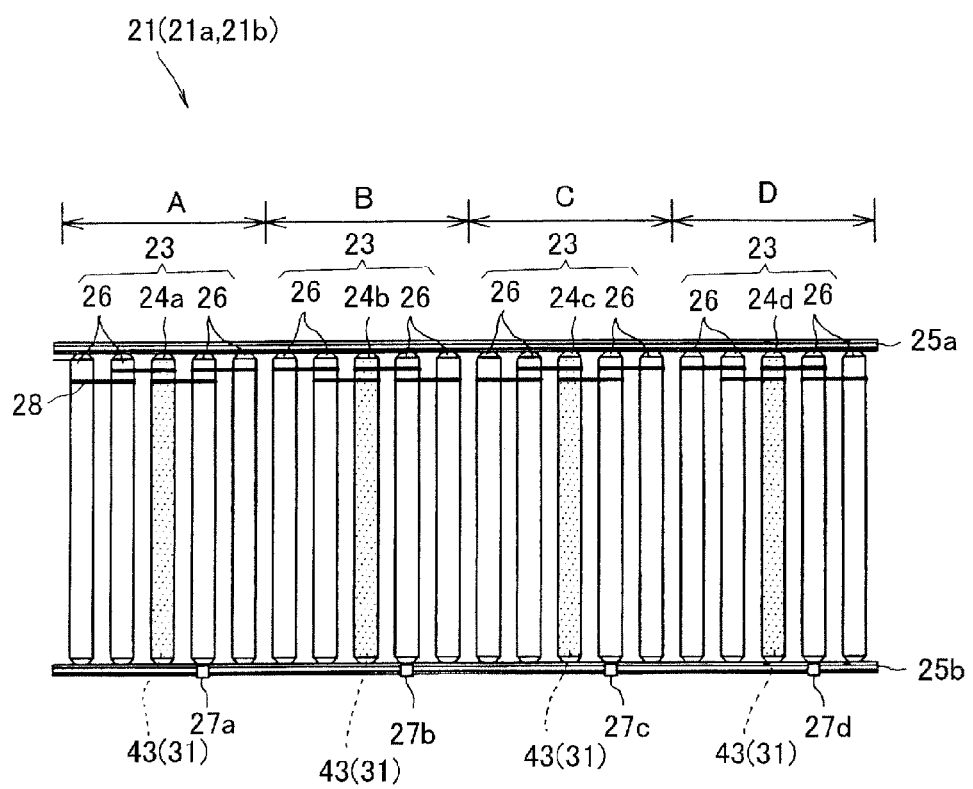
FIG. 4 is a plan view showing a linear conveying device.

As shown in FIG. 4, the linear conveying devices 21a and 21b each are divided into four control zones consisting of zones A to D. Each of the zones A to D has a group of rollers 23, frames 25a and 25b, and sensors 27a to 27d.

The group of rollers 23 includes the motor-incorporating rollers 24a to 24d and free rollers 26 without a driving mechanism such as a motor.

Figures 5A, 5B:
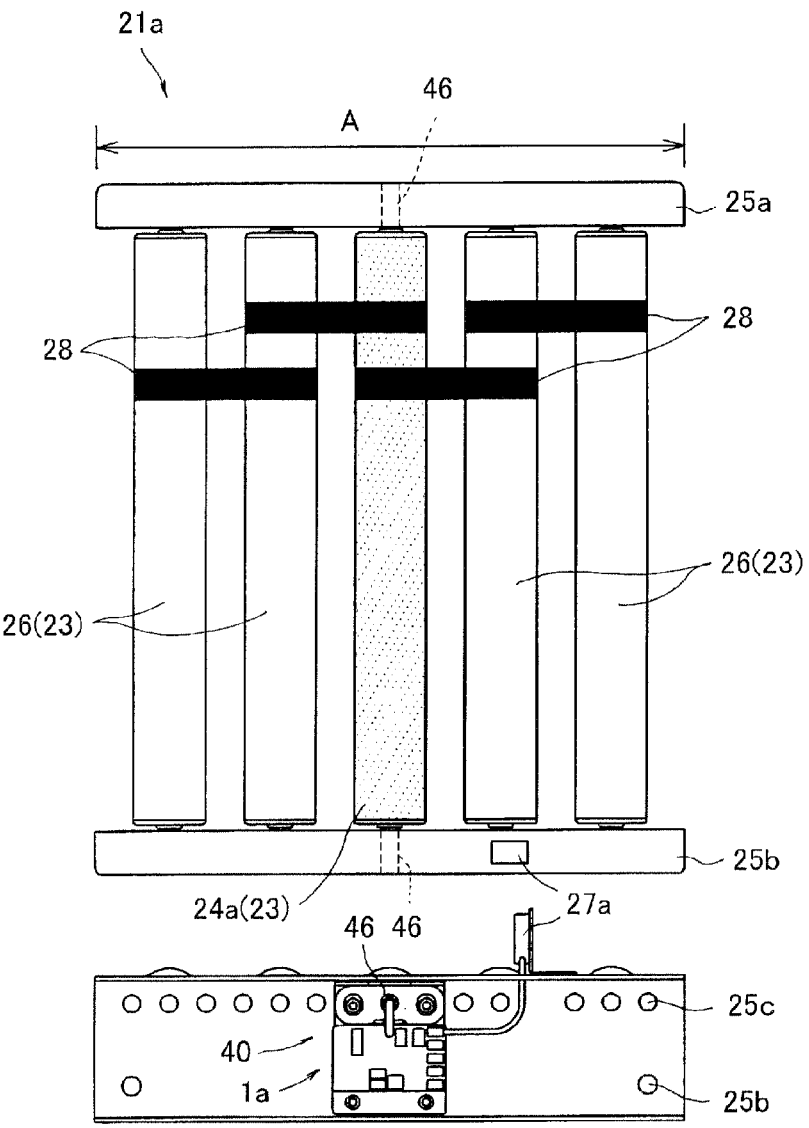
FIGS. 5A and 5B show one zone of the linear conveying device, FIG. 5A being a plan view thereof and FIG. 5B being a front view thereof.

As shown in FIG. 5A, the zone A is configured by one roller 24a incorporating a motor and two free rollers 26 located at each side of the roller 24a. In short, the group of rollers 23 in the zone A is constituted by five rollers 23.

A belt 28 is spanned between adjacent rollers 23, thereby rotating the five rollers 23 in the same direction in conjunction with rotation of the roller 24a.

The zones B to D are also configured in the same manner as the zone A.

As shown in FIG. 5B, in the zone A, the frame 25a and 25b each have at its side face a plurality of holes 25c for supporting the rollers 23.

Further, the frames 25a and 25b each have a fixing bracket 40 fixed to its side face. To the fixing bracket 40, a fixing shaft 46 for fixing the roller 24a described below is fixed.

The fixing bracket 40 has the zone controller 1a fixed to its center, to which the roller 24a is electrically connected.

The zones B to D each are configured in the same manner as the zone A, but exclusive of the zone controller 1a at the fixing bracket 40. That is because, as described below, one zone controller 1a controls the zones A to D. For this purpose, the rollers 24b to 24d in the zones B to D are electrically connected to the zone controller 1a disposed in the zone A.

As shown in FIGS. 1, 4, 5A, and 5B, the sensors 27a to 27d are fixed to to the top face of the frame 25b and connected to the same zone controller 1a.

The sensor 27a to 27d each are a detector for detecting presence status (presence or absence of an article 70), consisting of a reflective sensor that irradiates light on an article so as to detect presence or absence of the article by reflected light.

Figure 6:
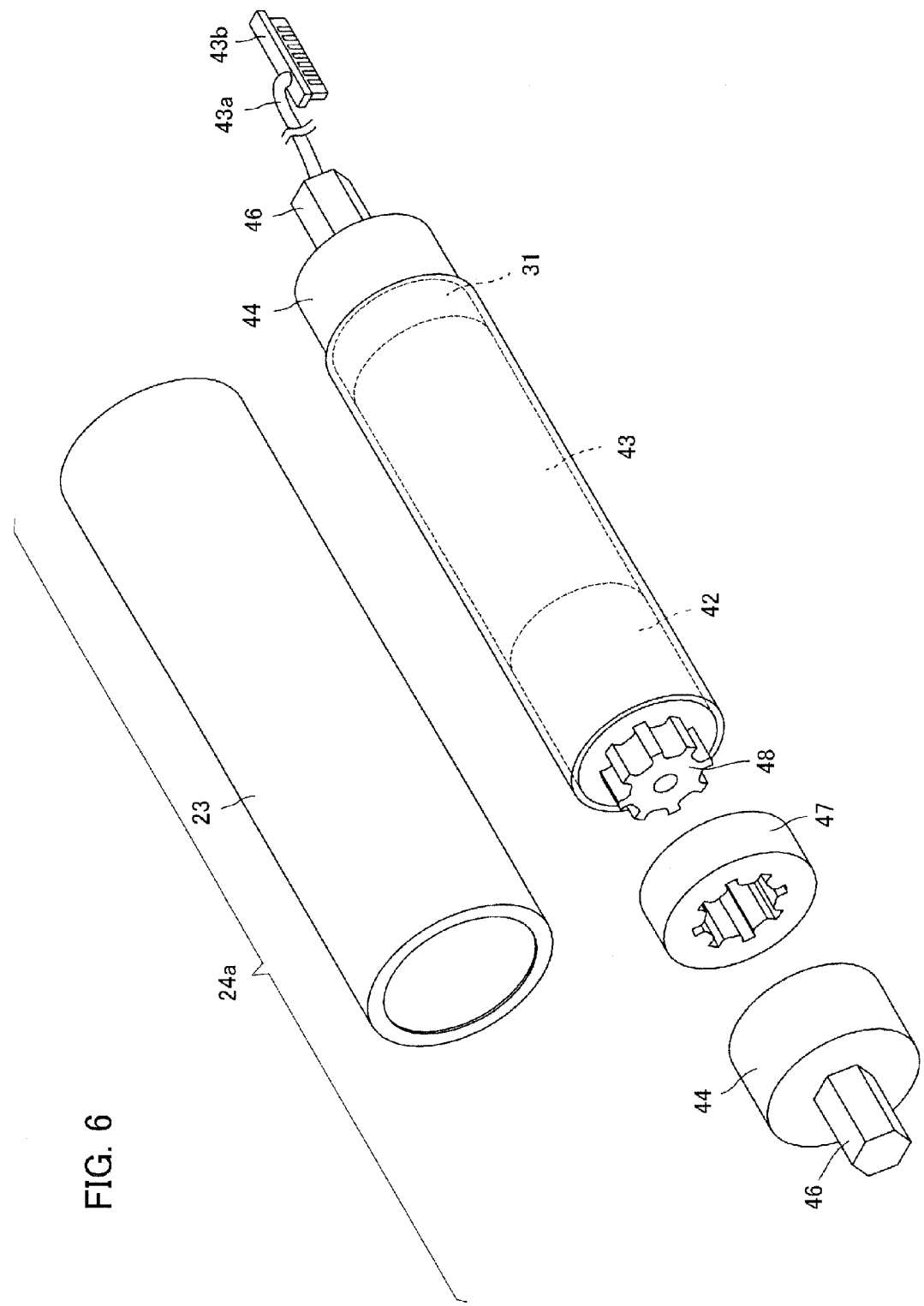
FIG. 6 is an exploded perspective view showing a roller incorporating a motor.

As shown in FIG. 6, as well as the known one, the rollers 24a to 24d each incorporate a gear 42, a brushless motor 43, a pair of lids 44, an output board 47, and a rotation detector 31 in the roller 23.

The gear 42 is a known reducer provided with an output shaft 48.

The brushless motor 43 is a known DC brushless motor provided with a cable 43a, a connector 43b, and an output shaft. The brushless motor 43 rotates at DC 24V.

The lids 44 each have a bearing and the fixing shaft 46 and rotate relative to the fixing shaft 46.

The rotation detector 31 detects the number of rotation and is preferably constituted by a Hall IC or a rotary encoder.

The output shaft of the brushless motor 43 is connected to the gear 42. The output shaft 48 of the gear 42 is connected to the roller 23 via the output board 47. The lids 44 are respectively attached to both ends of the roller 23. Therefore, rotation of the output shaft of the brushless motor 43 rotates the roller 23 relative to the fixing shaft 46.

All the rollers 24a to 24d belonging to the linear conveying device 21a are connected to the zone controller 1a. All the rollers 24a to 24d belonging to the linear conveying device 21b are connected to the zone controller 1b.

The zone controllers 1a and 1b each output driving and stopping signals to the rollers 24a to 24d discretely, which discretely operate in response to the signals.

The rollers 24a to 24d, for example, are activated sequentially from upstream in response to a flow of an article and sequentially stop when the article has been transferred from their own zones to their adjacent zones and no article is present in the own zones.

Now, the fault diagnosis method for the roller conveyor 20 will be described in detail below.

In the roller conveyor 20 in FIG. 1, the zone controllers 1a and 1b each store a predetermined program for conveying articles, thereby independently controlling the respective linear conveying devices 21, as described above. Specifically, the zone controller 1a controls the zones A to D of the linear conveying device 21a, while the zone controller 1b controls the zones A to D of the linear conveying device 21b. The zone controllers 1a and 1b each further store other programs, which include a plurality of fault diagnosis programs and a plurality of criterial parameters. That means the fault diagnosis programs are also stored in the zone controllers 1a and 1b. The fault diagnosis programs are transferred from the computer 51 in the supervisory controller 50 and stored in the memories 16 in the zone controllers 1a and 1b.

The criterial parameters are stored in the zone controllers 1a and 1b as criterial information. There is provided more than one fault diagnosis program as described below. In the present embodiment, all the fault diagnosis programs are stored in the memories 16. The memories 16 each store the criterial parameters corresponding to the fault diagnosis programs and variations of operating parameters in the event of a failure in any of components as fault information by component.

Fault diagnosis for the roller conveyor 20 is performed by comparing the previously-obtained criterial parameters as the criterial information and the operating parameters obtained at the time of diagnosis as present status information. Additionally in the event of a difference between the both parameters above a predetermined level, a faulty component is identified in reference to the fault information by component. For that purpose, pieces of fault information by component are stored as profiles of electric current (current profile), for example, and compared with the operating parameter. Then, a piece of fault information by component resembling the operating parameter is selected, so as to identify the faulty component.

The criterial parameters as criterial information and the operating parameters as present status information each show a rotational state (rotational information) of the rollers 23 when the rollers 23 are operated in a predetermined operating pattern and information (electrical information) relating to increase and decrease of voltage or current of the rollers 24a to 24d and are collection of data referred to as a profile correlated with time.

The criterial parameters and the operating parameters can be obtained by means such as a repetition of rotation and stop or a repetition of normal rotation and reverse rotation of the rollers 24a to 24d.

Now, a method for detecting a fault by a predetermined operation for obtaining a parameter in activation of the roller conveyor 20 will be described in detail, taking the linear conveying device 21a as an example.

Figure 7:
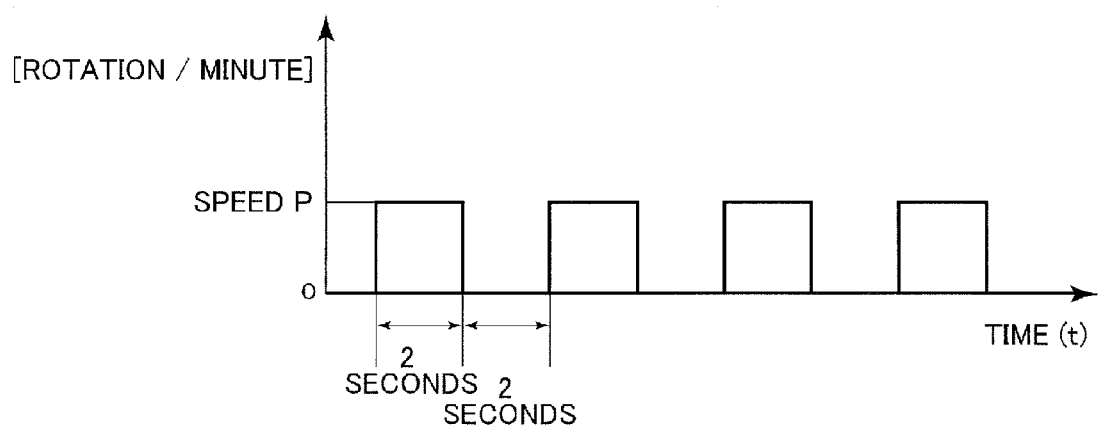
FIG. 7 is a timing chart showing a predetermined initial operation of a roller by the fault diagnosis method of the embodiment of the present invention.

First, the rollers 24a to 24d are subjected to cycles of normal rotation and stop as shown in FIG. 7 so as to obtain a criterial parameter (hereinafter referred to as a first operation for obtaining parameters).

Specifically, immediately after installation of the linear conveying device 21a and with none of fault, the rollers 24a to 24d are operated in a cycles of normal rotation and stop as shown in FIG. 7, so as to start execution of the first operation. More specifically, one cycle consists of normal rotation (CW) of the roller 24a for two seconds at a speed P and stop of the roller 24a for two seconds thereafter. This cycle is repeated three times. At this time, the speed P is 1 to 50 rotations/minute, which is a low-speed rotation. Hence, the speed P can be discretionarily set. In these cycles of normal rotation and stop, the roller 24a is rotated with no load.

Figure 8:
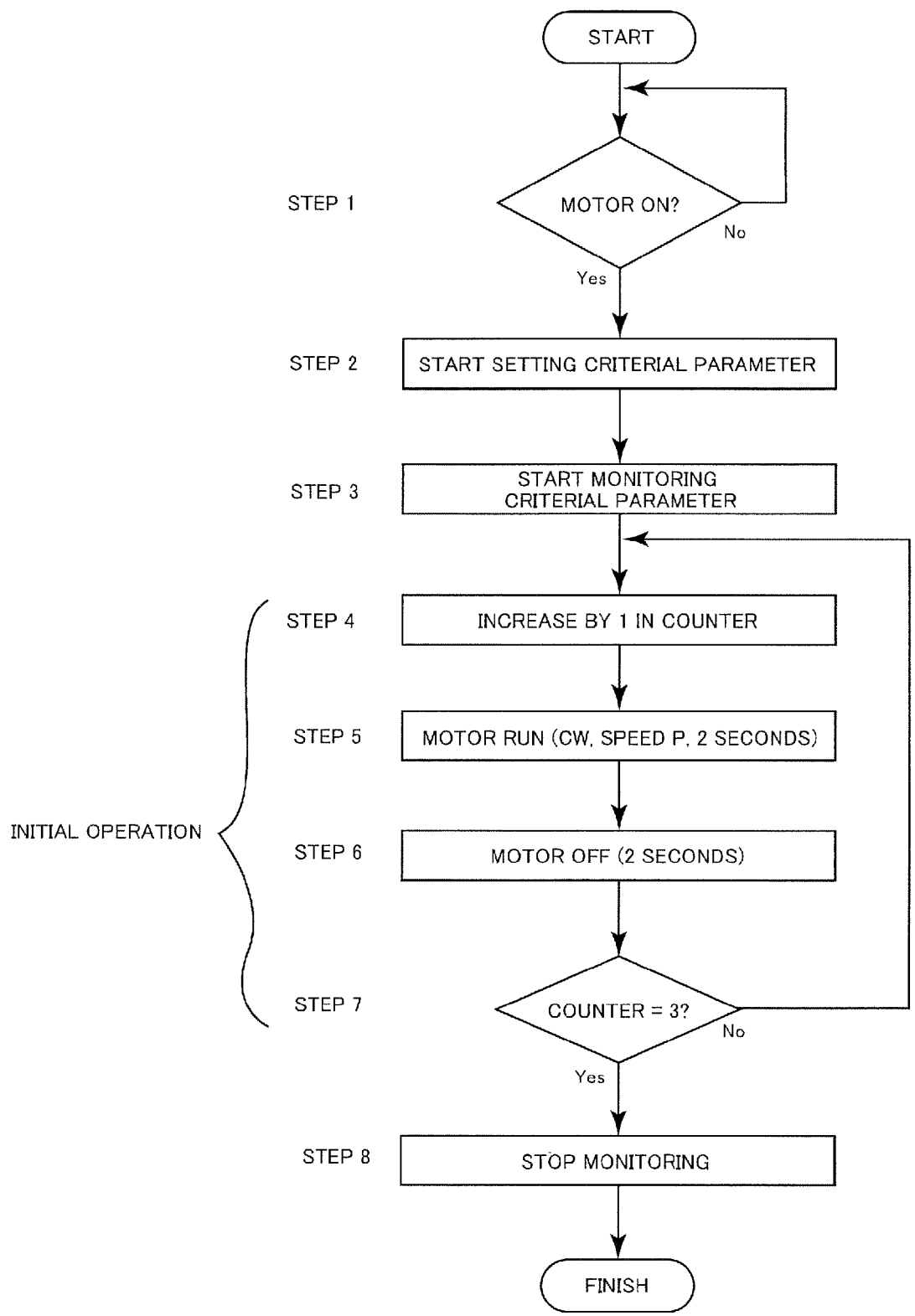
FIG. 8 is a flow chart showing a program for setting a criterial parameter.

FIG. 8 is a flow chart showing a program for setting a criterial parameter that is a criterion for detecting a fault of the linear conveying device 21a.

Firstly, at step 1, whether the motor (brushless motor 43) is powered ON or not is confirmed. At step 2, a setting of the criterial parameter is started.

At step 3, monitoring of the criterial parameter is started. At this time, the criterial parameter is a profile correlated of variation of current of the brushless motor 43 with time. In other words, the criterial parameter is a continuous quantity of current for a predetermined period of time.

At steps 4 to 7, three times of the cycles of normal rotation and stop are executed.

At step 4, using a counter operative on the program to count the number of the cycles, the counter is increased by one. At step 5, the motor is run. At this time, the motor is normally rotated (CW) for two seconds at the speed P.

At step 6, the motor is stopped for two seconds. At step 7, whether the number of the counter is three or not is confirmed, and if it is three, the procedure proceeds to step 8. If it is less than three, the procedure returns to step 3.

At step 8, the monitoring of the criterial parameter is finished and a series of procedures are completed.

The above-mentioned steps 1 to 8 complete the setting of the criterial parameter.

Figure 9:
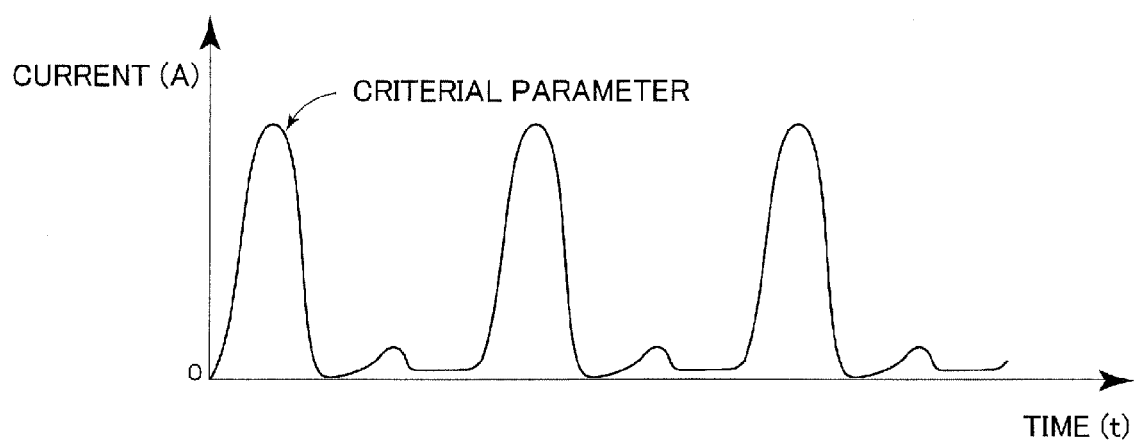
FIG. 9 is a timing chart showing the criterial parameter.

A current profile showing the set criterial parameter is shown in FIG. 9. The criterial parameter in FIG. 9 shows current variation depending on the cycles of normal rotation and stop of the roller 24a.

Now, processes of obtaining the operating parameter and detecting a fault will be described in detail below.

Figure 10:
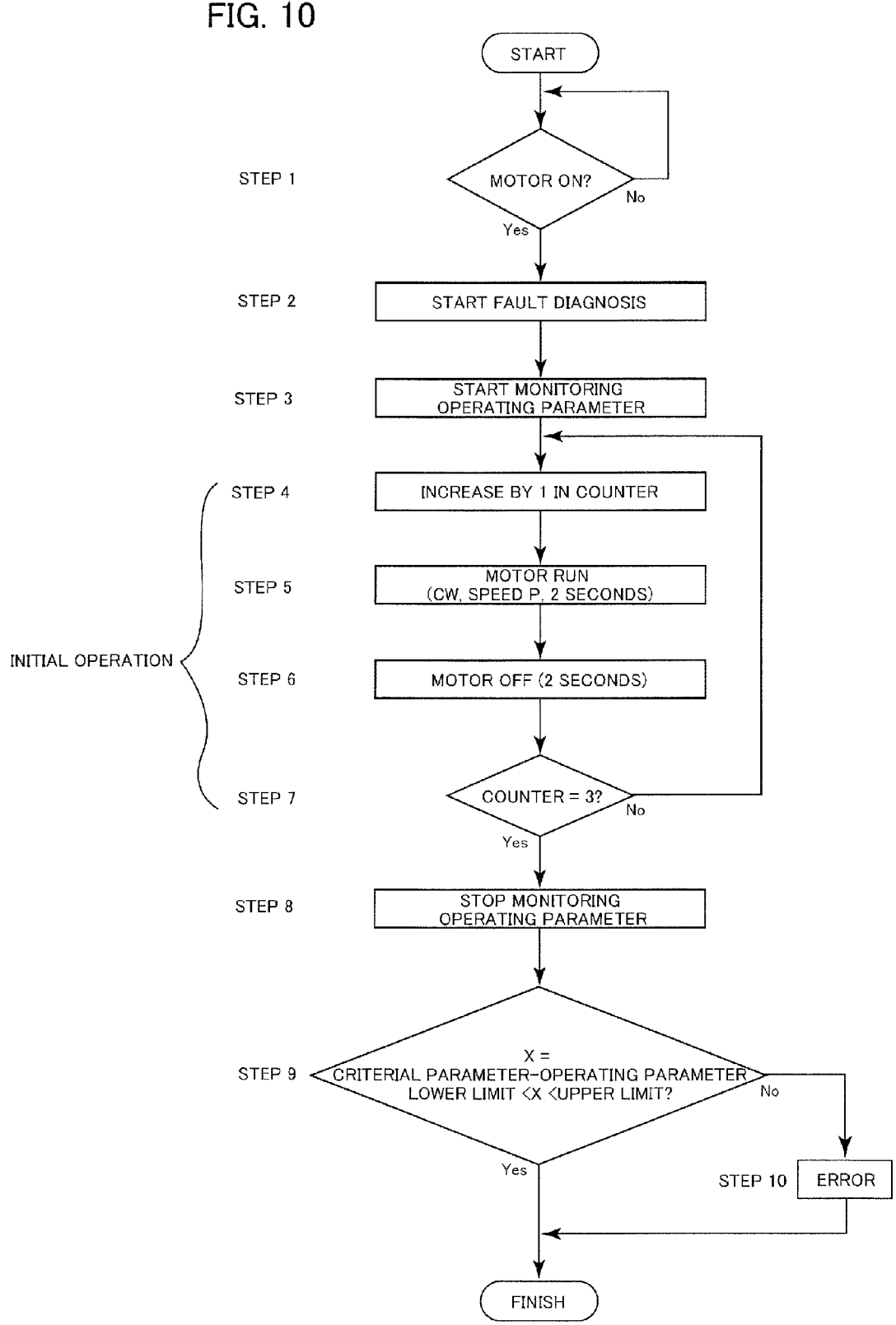
FIG. 10 is a flow chart showing a program for detecting a fault by obtaining an operating parameter in the predetermined initial operation.

FIG. 10 is a flow chart showing a program for detecting a fault by obtaining the operating parameter in activation of the linear conveying device 21a in the morning, for example.

Specifically, when the linear conveying device 21a is activated and started up at the beginning of work of the day, the program in FIG. 10 is automatically executed.

From step 1 to step 8, the same procedures as those for the m above-mentioned setting of the criterial parameter are done, so as to execute the first operation and monitor the operating parameter.

Figure 11:
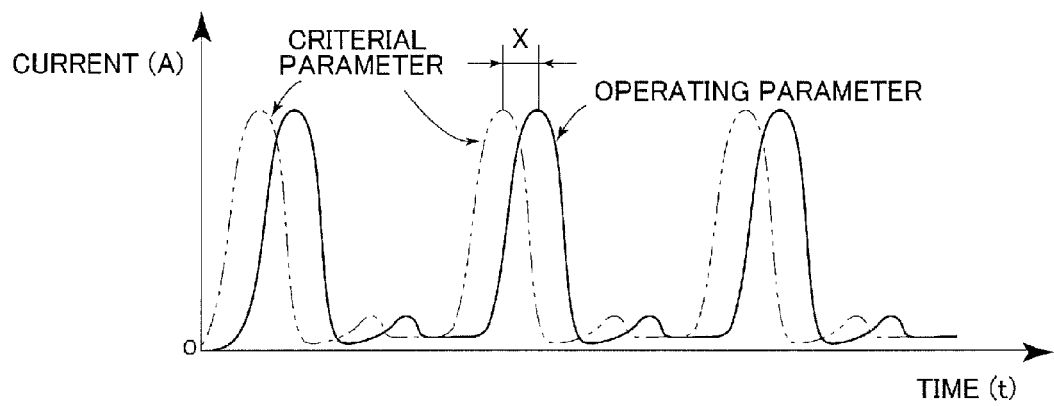
FIG. 11 is a timing chart showing a criterial parameter and an operating parameter by way of comparison.

In step 9, a difference X between the criterial parameter and the operating parameter is confirmed. The difference X is, as shown in FIG. 11, a lagging degree of current variations of the criterial parameter and the operating parameter. When the difference X is out of range between an upper limit and a lower limit, the procedure proceeds to step 10, so as to output an error signal. When the difference X is within the range between the upper and lower limits, the fault diagnosis is finished.

By steps 1 to 10, the difference X between the criterial parameter and the operating parameter is obtained. In a case where the difference X is large, there is a possibility of abrasion or loosening in a driving mechanism, abrasion of the fixing bracket 40, or the like. Shortly, when the difference X is out of the range between the upper and lower limits, it can be determined that the linear conveying device 21a has a fault in a specific zone.

Herein, the upper and lower limits of the difference X can be discretionarily set.

Alternatively, a failed part can be specified by a difference of profiles of the criterial parameter and the operating parameter.

Specifically, the linear conveying devices 21a and 21b each include the motor-incorporating rollers 24a to 24d, the free rollers 26, and the belt 28 as machine components. Further, the rollers 24a to 24d each include components such as the gear 42, the brushless motor 43, the output board 47, and the bearing and the free rollers 26 each also include components.

A fault of these components causes specific change in the current profile. Damage of the belt 28, for example, generates pulse current changes at a constant frequency. A fault of the gear 42 generates pulse current changes at a constant frequency, though the frequency of changes is short. A fault of the bearing is accompanied by an elevated level of current overall or generates irregular current changes. Break of the belt 28 is accompanied by a decreased level of current overall due to reduced load.

In this embodiment, changes from the criterial parameter when any of the components has an abnormal situation are stored in the memories 16 as the fault information by component.

A faulty component is specified by comparing the operating parameter and pieces of fault information by component and selecting the information resembling the operating parameter.

Upon determination of a fault of the linear conveying device 21a, information of the fault is transferred to the supervisory controller 50 and shown on a display not shown.

The determination of a fault is performed by the zone controllers 1a and 1b with respect to each zone, so that a faulty zone is specified. Further, a faulty component is specified by examining the profiles with the computer 51.

Consequently, it is possible to specify which component and in which zone has an abnormal situation.

The cycles of normal rotation and stop is executed for the above-mentioned operation for obtaining a parameter, but this is an example and it is also possible to execute an operation check by cycles of normal rotation and reverse rotation or an inching.

Besides, the number of cycles of the initial operation of rollers can be discretionarily set.

An operating time of the rollers 24a to 24d for obtaining the criterial parameter or the operating parameter may be extremely lengthened. With testing for endurance for 100 to 1000 hours, the criterial parameter or the operating parameter may be determined based on current values or profiles at the testing.

In the above-mentioned first operation for obtaining a parameter, the roller 24a is rotated with no load, but this is an example and it is possible to convey a dummy load. It is suitable to use an article to be conveyed that is set to a discretional weight such as 5 kg, 10 kg, or 50 kg as the dummy load.

Alternatively, the weight of an article may be changed by 5 kg in a range of 5 to 200 kg, for example, in order to obtain current values or changes of current profile in each case as criterial parameters, which are stored as a quantified data table. It is also possible to appreciate the weight of an article by comparing the criterial parameters in the data table with an obtained operating parameter in the operating roller conveyor 20.

Next, a method for detecting a fault by another operation for obtaining a parameter in activation of the roller conveyor 20 (hereinafter referred to as a second operation for obtaining a parameter).

Figure 12:
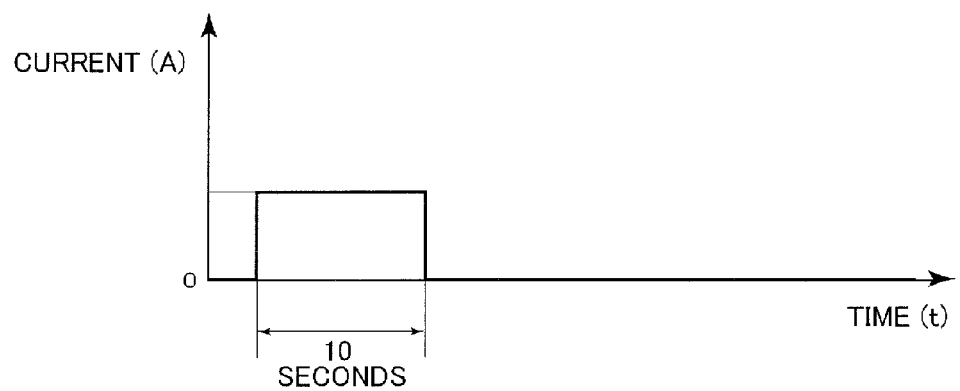
FIG. 12 is a timing chart showing another initial operation of a roller by the fault diagnosis method of the embodiment of the present invention.

Cycles of normal rotation and free-run stop are executed for the second operation for the linear conveying device 21a. Herein, "free-run stop" means to stop spontaneously after inertia rotation. Specifically, as shown in FIG. 12, after current supply to the brushless motor 43 for 10 seconds so as to normally rotate (CW) the roller 24a at a speed Q for 10 seconds, the current supply to the brushless motor 43 is stopped. The roller 24a continues to rotate through inertia and then stops. At this time, the speed Q of the roller 24a is 100 to 300 rotations/minute, which is a high-speed rotation. Hence, the speed Q can be discretionarily set. In these cycles of normal rotation and free-run stop, the roller 24a is rotated with no load.

Figure 13:
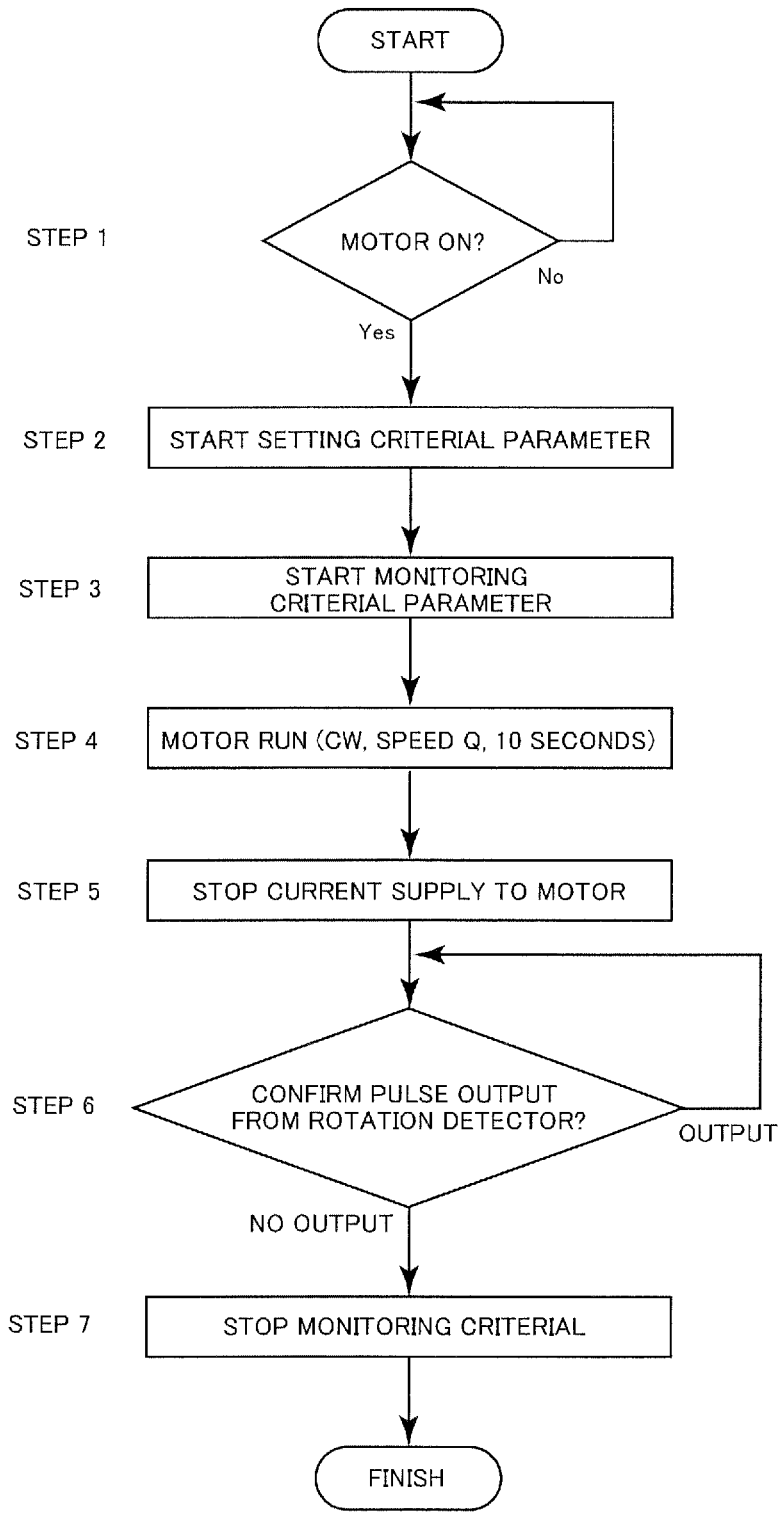
FIG. 13 is a flow chart showing another program for setting a criterial parameter.

The program shown in FIG. 13 sets a criterial parameter for detecting a fault during the cycles of normal rotation and free-run stop.

Firstly, at step 1, whether the motor (brushless motor 43) is powered ON or not is confirmed. At step 2, a setting of a criterial parameter is started.

At step 3, monitoring of the criterial parameter is started. At this time, the criterial parameter is a profile correlated of the speed (rotation number) of the rotation detector 31 with an operating time (rotation time) of the roller 24a. In other words, the criterial parameter is a continuous quantity of speed for a predetermined period of time.

At step 4, the motor is run by current supply. At this time, the motor is normally rotated (CW) for 10 seconds at the speed Q. At step 5, the current supply to the motor is stopped. The motor continues to rotate through inertia.

At step 6, whether a pulse output from the rotation detector 31 is present or not is confirmed. If the pulse output is present, the procedure continuously observes the pulse output until the pulse output stops, without proceeding to step 7. If the pulse output is not present, the procedure proceeds to step 7.

At step 7, the monitoring of the criterial parameter is finished.

The above-mentioned steps 1 to 7 complete the setting of the criterial parameter.

Figure 14:
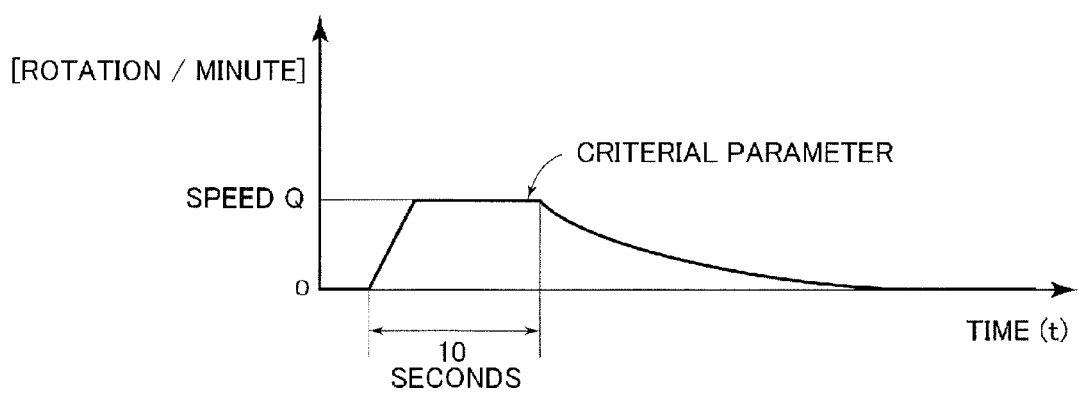
FIG. 14 is a timing chart showing the criterial parameter.

The set criterial parameter is a speed profile shown in FIG. 14. In other words, FIG. 14 shows a braking time until the roller 24a come to a stop after normal rotation through inertia.

Figure 15:
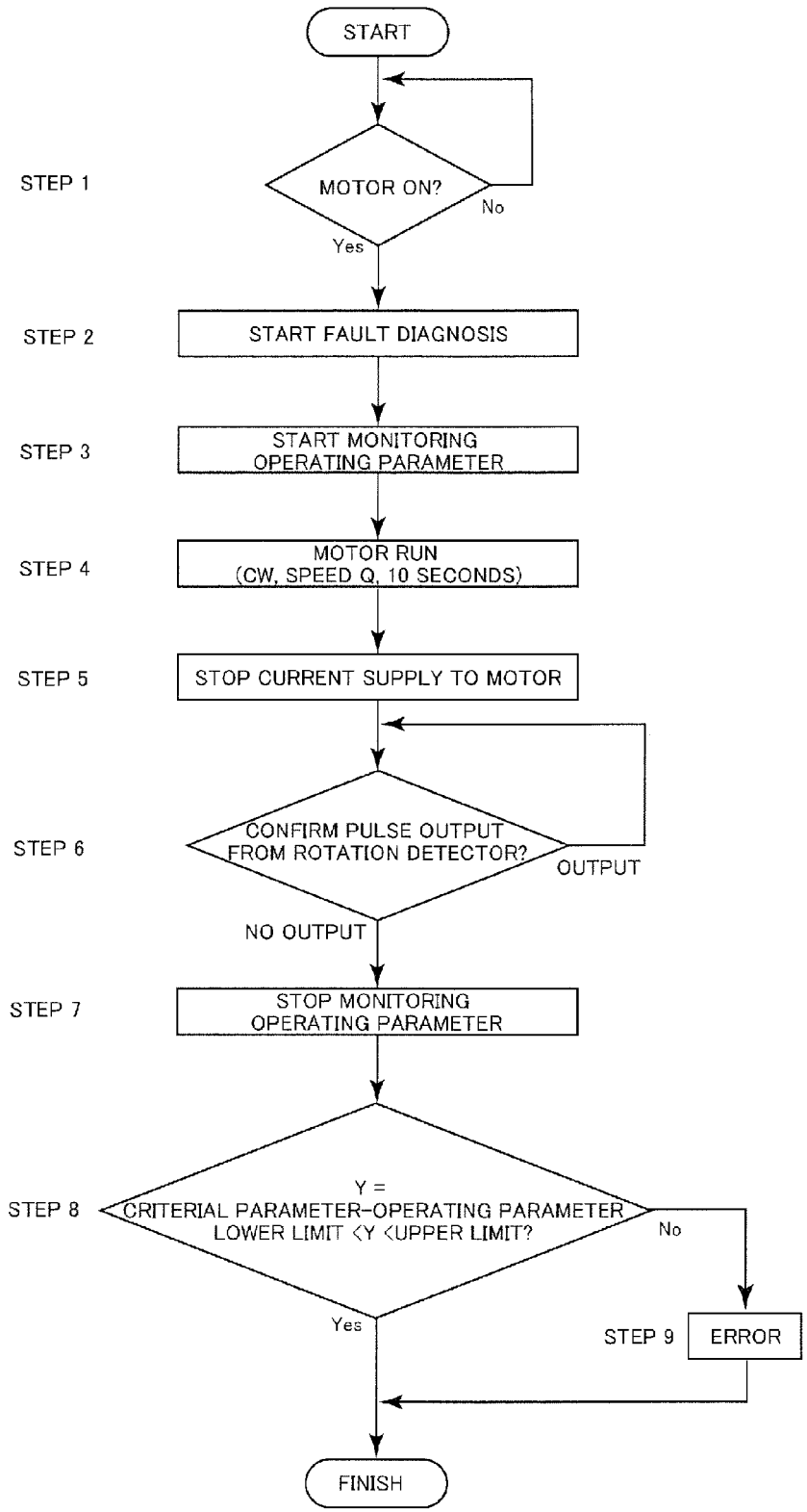
FIG. 15 is a flow chart showing another program for detecting a fault by obtaining an operating parameter in another initial operation of a roller.

FIG. 15 is a flow chart showing another program for detecting a fault by obtaining an operating parameter by executing the above-mentioned second operation for obtaining parameters to the linear conveying device 21a.

From step 1 to step 7, the same procedures as those for the above-mentioned setting of the criterial parameter are done, that is, to execute the second operation for obtaining parameters and to monitor the operating parameter.

Figure 16:
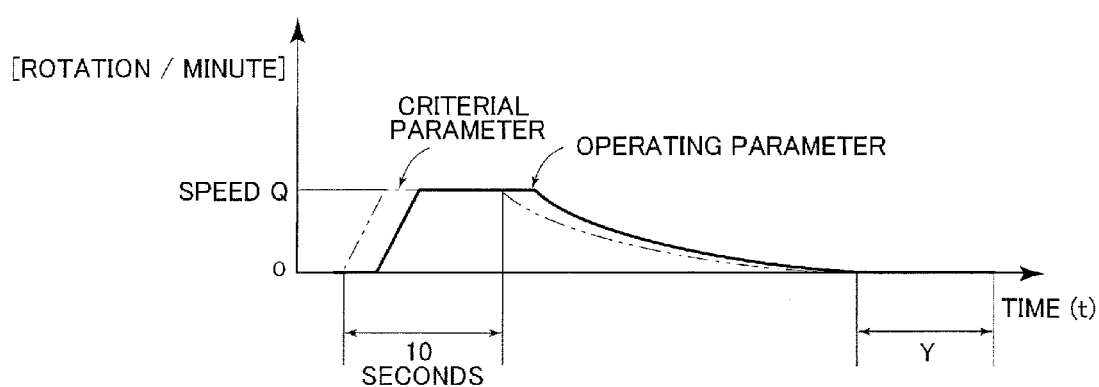
FIG. 16 is another timing chart showing a criterial parameter and an operating parameter by way of comparison.

In step 8, a difference Y between the criterial parameter and the operating parameter is confirmed. The difference Y is, as shown in FIG. 16, a lagging degree of speed variations of the criterial parameter and the operating parameter. When the difference Y is out of range between an upper limit and a lower limit, the procedure proceeds to step 9, so as to output an error signal. When the difference Y is within the range between the upper and lower limits, the fault diagnosis is finished.

By steps 1 to 9, the difference Y between the criterial parameter and the operating parameter is obtained. In a case where the difference Y is large, there is a possibility of abrasion of the belt 28, the gear 42, or the like. Shortly, when the difference Y is out of the range between the upper and lower limits, it can be determined that the linear conveying device 21a has a fault. It is specifically determined that the belt 28, the gear 42, or the like in the linear conveying device 21a has abrasion. Herein, the upper and lower limits of the difference Y can be discretionarily set.

The criterial parameters and the operating parameters described above are stored as a quantified data table in the memories 16 of the zone controllers 1 (1a and 1b). The parameters are monitored as an image as shown in FIGS. 9 and 11 by using the computer 51 of the supervisory controller 50. Besides, the parameters are transferred to the computer 51 so as to accumulate data, thereby enabling a fault prediction.

In the second operation described above, the speed profile of the roller 23 (roller 24a) is obtained with pulse output (rotation number) from the rotation detector 31, but this is an example. It is also possible, for example, that another rotation detector is provided on the free rollers 26 with no motor, thereby obtaining a speed profile. By this way, monitoring of speed variation of the free rollers 26 instead of the roller 24a limits influence by the gear 42. That facilitates detection of a fault of the belt 28.

Obtaining of the operating parameter by the first operation and obtaining of the operating parameter by the second operation are preferably done continuously at the beginning of the day, but may be done at intervals, like every other day.

Next, a method for detecting a fault during operation of the roller conveyor 20 will be described in detail below.

As shown in FIG. 1, in the roller conveyor 20, the linear conveying devices 21a and 21b convey an article 70. At this time, the devices 21a and 21b are controlled by a linear conveying program including a simplified fault diagnosis program shown in a flow chart in FIG. 17.

A brief summary of the linear conveying program including the simplified fault diagnosis program will be described using the zone B in the linear conveying device 21a in FIG. 4 as an example. Herein, the zone to be controlled is referred to as the own zone and the sensor 27 in the own zone is referred to as the own sensor. The motor (motor-incorporating roller 24h) in the own zone B starts rotation upon detection of an article 70 by a first upstream sensor 27a.

When the article 70 arrives in the own zone B, whether a first downstream sensor 27c is OFF is confirmed and the article 70 is sent to the zone C.

In this way, the zones A to D each detect an estimated article of arrival before the article arrives in the respective zones.

Figure 17:
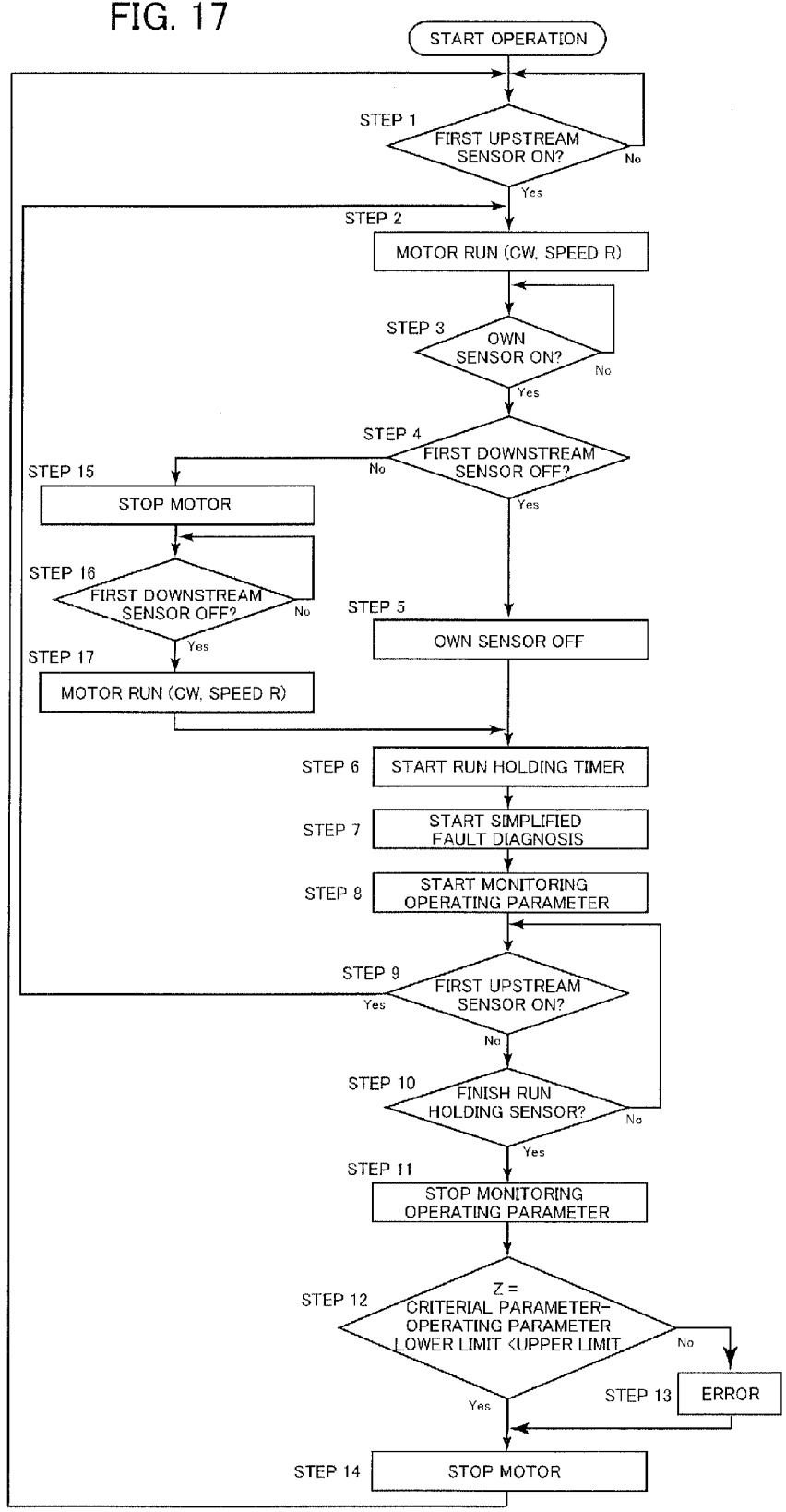
FIG. 17 is a flow chart showing a linear conveying program containing a simplified fault diagnosis program.

Herein, "the first upstream sensor" denotes a sensor in a first upstream zone from the own zone, being an expression for explaining the flow chart in FIG. 17, while "the first downstream sensor" denotes a sensor in a first downstream zone from the own zone.

The linear conveying program including the simplified fault diagnosis program is constituted by steps 1 to 17.

At steps 1 and 2, whether the first upstream sensor 27a is ON is confirmed and the own motor runs (rotates) at a speed R when the condition is satisfied.

At step 3, whether the own sensor 27b is ON is confirmed, and the procedure proceeds to the next step when the condition is satisfied. At step 4, whether the first downstream sensor 27c is OFF is confirmed, and the procedure proceeds to the next step when the condition is satisfied. In a case where the condition is not satisfied, the procedure proceeds to step 15.

At steps 15 to 17, after stopping of the motor in the own zone, whether the first downstream sensor 27c is OFF is confirmed, and the motor in the own zone is rotated at the speed R when the condition is satisfied, and then the procedure proceeds to step 6.

At steps 5 and 6, after the own sensor 27b is turned OFF, a RUN holding timer is started.

At step 6, the RUN holding timer starts.

At steps 7 and 8, the simplified fault diagnosis program is started so as to measure electric current (operating parameter) in driving the motor in the own zone with no load.

At steps 9 to 14, whether the first upstream sensor 27a is ON is confirmed, and the procedure goes back to step 2 when the condition is satisfied. In a case where the condition is not satisfied, whether the RUN holding timer has expired is confirmed. Upon stopping of the RUN holding timer, the measurement of the electric current (operating parameter) of the motor in the own zone with no load is finished.

The measured current (operating parameter) is compared with the pre-set criterial parameter. When a difference Z between the criterial parameter and the operating parameter is out of a range between an upper limit and a lower limit, an error signal is outputted. When the difference Z is within the range between the upper and lower limits, the motor in the own zone is stopped and the procedures following step 1 are repeated again.

The above description is a brief explanation of the flow chart shown in FIG. 17.

By steps 1 to 17 described above, the difference Z between the criterial parameter and the operating parameter is obtained. Monitoring of the electric current (operating parameter) of the roller 24a (brushless motor 43) with no load detects a fault in a driving system. That allows a simplified fault diagnosis even during operation of the roller conveyor 20.

The above-mentioned embodiments are configured in such a manner that the zone controllers 1a and 1b each include the memory 16 storing criterial information (criterial parameters) and present status information (operating parameters) and the fault diagnosis program as an information detector and simultaneously an information comparator, so that the resulting information is to be transferred to the supervisory controller 50. It is also possible to have such a configuration that the criterial information, the present status information, and the fault diagnosis program are stored in a supervisory controller. This configuration will be described in detail below, in reference to FIG. 18.

Figure 18:
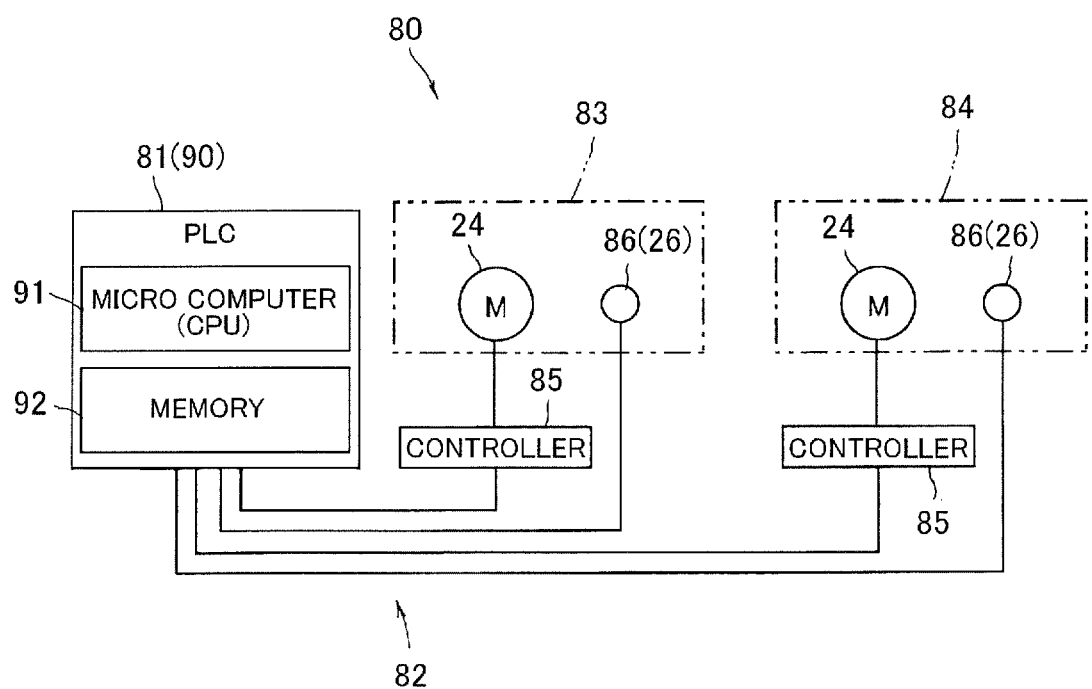
FIG. 18 is a block diagram showing a roller conveyor of another embodiment of the present invention.

FIG. 18 shows a roller conveyor 80 of another embodiment in this invention. The roller conveyor 80 mainly consists of a PLC (Programmable Logic Controller) 81, conveying devices 83 and 84, and zone controllers 85.

The PLC 81 is a controller containing a memory 92 and a micro computer (CPU) 91 and situated upstream of the zone controllers 85, so as to function as a supervisory controller 90.

The conveying devices 83 and 84 each include a roller 24 incorporating a motor and a rotation detector 86. The rotation detector 86 is a known rotary encoder and mounted to a free roller 26. The zone controllers 85 each are a known motor driving circuit.

The PLC 81 and the zone controllers 85 are connected via a wiring 82. The zone controllers 85 are respectively connected to the conveying device 83 and 84. The rotation detectors 86 are connected to the PLC 81. The PLC 81 controls the conveying devices 83 and 84 via the zone controllers 85.

The roller conveyor 80 includes only the motor driving circuit as the zone controller 85, dispensing with a CPU. Therefore, in the fault diagnosis method for the roller conveyor 80 transfers information of the zone controller 85 and the rotation detector 86 to the PLC 81 (i.e., supervisory controller) so as to obtain a criterial parameter and an operating parameter. That is, also by the fault diagnosis method for the roller conveyor 80, a fault diagnosis similar to that by the above-mentioned fault diagnosis method for the roller conveyor 20 is performed.

As described above, the roller conveyors 20 and 80 and the fault diagnosis methods for the roller conveyors 20 and 80 in the present embodiments achieve determination of time for replacement of a plurality of consumable members by kind.

The above-mentioned embodiments describe examples using a time variation of current or speed for the criterial parameter or the operating parameter, but the present invention is not limited thereto. It is possible to use other parameters such as the rotation number, an angle, a travel distance, and a length, which are able to be measured and quantified, for example. Shortly, it is possible to use any parameter capable of fault diagnosis.

The above-mentioned embodiments describe examples obtaining a criterial parameter by execution of a predetermined operation for obtaining a parameter, but the present invention is not limited thereto. It is possible to use a theoretical value as a criterial parameter, for example.

The above-mentioned embodiments describe an example using the micro computer (CPU) 15, but the present invention is not limited thereto. It is possible to use a micro controller installing members such as a CPU, a memory, an input-output (I/O) circuit, and a timer circuit in one integrated circuit, for example.

The present invention can be used not only for fault diagnosis but also for the purpose of estimation of time for replacement of components by monitoring of temporal change of a device.

Further, in addition to the characteristic configuration of the present embodiments, it is also recommended to store a program accumulating actual working hours of a device so as to estimate a level of damage of components by the simultaneous use of the result of diagnosis by the fault diagnosis program and the actual working hours.

The zone controller in the present embodiments can be used in other conveyors such as a belt conveyor and a chain conveyor than a roller conveyor.

The invention claimed is:

1. A roller conveyor comprising:
a plurality of rollers for conveying articles;
at least one motor for rotating at least one of the rollers; and at least one controller for controlling the at least one motor, the conveyor obtaining information relating to rotation of the motor and/or the roller as rotational information and information relating to a current supplied and/or a voltage applied to the motor as electrical information and generating at least one of: a) a first profile showing a correlation between time and the rotational information; and b) a second profile showing a correlation between time and the electrical information, and the conveyor equipped with a memory for storing the at least one of the first and second profiles in normal operation of the conveyor as criterial information, an information detector for detecting at least one of the rotational information and the electrical information in a present situation of the conveyor as present status information, and a comparator for performing comparison of at least one of: a) the criterial information stored in the memory as the first profile with the present status information for rotational information; and b) the criterial information stored in the memory as the second profile with the present status information for electrical information.

2. The roller conveyor as defined in claim 1, being adapted to store in the memory a variation of the at least one of the rotational information and the electrical information in a case where any of components constituting the roller conveyor has a fault as fault information by component and to refer to the fault information for identifying a location of the fault.

3. The roller conveyor as defined in claim 1, being adapted to output a predetermined signal in a case where the comparison by the comparator shows that the present status information differs from the criterial information above a predetermined level.

4. The roller conveyor as defined in claim 1, wherein the criterial information is correlation between time and one selected from a group consisting of the current supplied and the voltage applied to the motor.

5. The roller conveyor as defined in claim 1, wherein the criterial information is composed of pieces of rotational information of the motor and/or the roller when the motor and/or the roller rotates through inertia after starting energization of the motor and stopping the energization.

6. The roller conveyor as defined in claim 1, the at least one controller comprising a plurality of controllers, the controllers each having the memory for storing the criterial information, the information detector, and the comparator, wherein the conveyor further comprises a supervisory controller being superior to the controllers and transfers a result of the comparison by the comparator to the supervisory controller.

7. The roller conveyor as defined in claim 1, the at least one controller comprising a plurality of controllers, wherein the conveyor further comprises a supervisory controller being superior to the controllers and collects the present status information in the supervisory controller from each of the controllers.

8. The roller conveyor of claim 1 wherein the one of the rotational information and the electrical information in the present status information is generated as a third profile showing a correlation between time and the one of the rotational information and electrical information in the present status information and the comparator compares the criterial information stored as one of the first and second profiles with the present status information in the third profile.

9. A controller for a conveyor, comprising:

at least one driving circuit for driving at least one motor for rotating at least one roller; and a control circuit for controlling the at least one motor, the controller obtaining information relating to rotation of the motor and/or the roller as rotational information and information relating to a current supplied and/or a voltage applied to the motor as electrical information and generating at least one of: a) a first profile showing a correlation between time and the rotational information; and b) a second profile showing a correlation between time and the electrical information, and the controller equipped with a memory for storing the at least one of the first and second profiles in normal operation of the conveyor as criterial information, an information detector for detecting at least one of the rotational information and the electrical information in a present situation of the conveyor as present status information, and a comparator for performing comparison of at least one of: a) the criterial information stored in the memory as the first profile with the present status information for rotational information; and b) the criterial information stored in the memory as the second profile with the present status information for electrical information, so that the controller obtains the present status information, performs a comparison of the criterial information stored in the memory with the present status information, and outputs a result of the comparison to another device.

10. The controller as defined in claim 9, wherein the criterial information is a correlation between time and one selected from a group consisting of the current supplied and the voltage applied to the motor.

11. A fault diagnosis method for a roller conveyor, the roller conveyor comprising a plurality of rollers for conveying articles; at least one motor for rotating at least one of the rollers; and at least one controller for controlling the at least one motor, the roller conveyor being provided with a memory containing a program and a micro computer capable of executing the program, the program including a fault diagnosis program and a criterial parameter generated and stored as a profile of the criterial parameter over time, the profile of the criterial parameter being at least one of: a) a first profile showing a correlation between time and rotational information relating to rotation of the one motor for rotating the one roller; and b) a second profile showing a correlation between time and electrical information relating to current supplied and/or a voltage applied to the one motor, and the method comprising the steps of:

performing operation of the motor and/or the roller based on the fault diagnosis program so as to obtain an individual state of the motor and/or the roller detected during the operation as an operating parameter;

performing comparison of a profile of the operating parameter with the stored profile of the criterial parameter; and determining a fault of the roller conveyor in a case where a difference between the parameters as a result of the comparison of the profiles is above a predetermined level.

12. The fault diagnosis method as defined in claim 11, the roller conveyor having a supervisory controller adapted to transfer a signal from and to the controller, the controller including the memory and the micro computer, and the method further comprising the steps of:

performing operation of the motor and/or the roller in response to a command from the supervisory controller;

obtaining the operating parameter of the motor and/or the roller during the operation by the controller;

determining presence or absence of a fault of the roller conveyor; and transferring the result of determination to the supervisory controller.

13. The method as defined in claim 11, wherein the roller conveyor has a supervisory controller adapted to transfer a signal from and to the controller, the supervisory controller including the memory and the micro computer, the method further comprising the steps of:

performing operation of the motor and/or the roller; and obtaining the operating parameter of the motor and/or the roller during the operation.

14. The method as defined in claim 11, further comprising the steps of:

storing rotation state of the motor and/or the roller in a case where any of components constituting the roller conveyor has a fault as fault information by component; and comparing the operating parameter with the fault information so as to identify a location of the fault.

15. The method as defined in claim 11, wherein the roller conveyor has a supervisory controller adapted to transfer a signal from and to the controller, the method further comprising the steps of sending a command from the supervisory controller to the controller so as to control timing for executing the fault diagnosis program.

16. The method as defined in claim 15, the at least one controller comprising a plurality of controllers, and the supervisory controller being connected to the plurality of controllers.

17. The method as defined in claim 11, wherein the criterial parameter and the operating parameter each are either at least one selected from a group consisting of a speed of the motor and/or the roller, a current of the motor, and an operating time of the motor and/or the roller or correlation between more than one of the group.

18. The method as defined in claim 11, wherein the fault diagnosis program is adapted to execute a predetermined operation upon activation of the roller conveyor, so as to obtain the operating parameter.

19. The method as defined in claim 11, wherein the operating parameter is obtained by execution of at least one selected from a group consisting of a cycle of activation and stop, a cycle of normal rotation and reverse rotation, and an inching on the motor and/or the roller with no load at a low-speed rotation.

20. The method as defined in claim 11, wherein the operating parameter is obtained by rotating of the motor and/or the roller with no load, stopping current supply to the motor, and then making a free-run stop of the roller after inertia rotation.

21. The method as defined in claim 11, wherein the fault diagnosis program is adapted to obtain the operating parameter of the motor and/or the roller with no load after conveyance of an article by the motor and/or the roller during operation of the roller conveyor.

* * * * *